US007628219B2

(12) United States Patent
Frauhammer et al.

(10) Patent No.: US 7,628,219 B2
(45) Date of Patent: Dec. 8, 2009

(54) HANDLE WITH DETECTING UNIT

(75) Inventors: Karl Frauhammer, Leinfelden-Echterdingen (DE); Gerhard Meixner, Filderstadt (DE); Axel Kuhnle, Freiberg A.N. (DE); Andreas Strasser, Rudersberg (DE); Erhard Hoffmann, Leinfelden-Echterdingen (DE); Dietmar Hahn, Gerlingen (DE); Andreas Heilmann, Pliezhausen (DE); Ulrich Single, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 870 days.

(21) Appl. No.: 11/019,428

(22) Filed: Dec. 22, 2004

(65) Prior Publication Data

US 2005/0161241 A1 Jul. 28, 2005

(30) Foreign Application Priority Data

Jan. 22, 2004 (DE) ...................... 10 2004 003 202

(51) Int. Cl.
*B23Q 5/00* (2006.01)
*B23Q 15/00* (2006.01)

(52) U.S. Cl. ............................... 173/18; 173/2; 173/29

(58) Field of Classification Search .................. 173/18, 173/2, 176, 180, 181, 29
See application file for complete search history.

(56) References Cited

U.S. PATENT DOCUMENTS 4,066,133 A 1/1978 Voss
4,794,273 A 12/1988 McCullough et al.
5,563,482 A * 10/1996 Shaw et al. ................ 318/272
5,583,386 A 12/1996 Meixner et al.
5,903,462 A 5/1999 Wagner et al.
6,111,515 A 8/2000 Schaer et al.
6,341,533 B1 * 1/2002 Schoeps ................. 73/862.23
6,536,536 B1 * 3/2003 Gass et al. ..................... 173/2
6,607,041 B2 * 8/2003 Suzuki et al. .................. 173/4
6,700,341 B2 * 3/2004 Schaer et al. ............... 318/432
6,799,643 B2 10/2004 Voulkidis et al.
6,843,327 B2 1/2005 Meixner et al.
2002/0129454 A1 * 9/2002 Hilscher et al. .............. 15/22.1
2002/0145724 A1 * 10/2002 Wursch et al. ............. 356/4.01
2003/0116333 A1 6/2003 Voulkidis et al.
2004/0226728 A1 11/2004 Boeni et al.

FOREIGN PATENT DOCUMENTS

CN 1256383 6/2000
DE 24 42 260 3/1976
DE 37 07 052 A1 9/1988
DE 195 07 955 9/1996
DE 198 57 061 6/2000
DE 101 60 864 6/2003
EP 0 759 343 A1 2/1997
EP 1 319 477 6/2003
EP 1 440 771 A1 7/2004
EP 1 452 278 A1 9/2004
GB 2 400 811 10/2004
WO 02/081154 10/2002
WO 2004/010387 1/2004

* cited by examiner

*Primary Examiner*—Rinaldi I. Rada
*Assistant Examiner*—Gloria R. Weeks
(74) *Attorney, Agent, or Firm*—Michael J. Striker

(57) ABSTRACT

A handle for an electric hand tool, which in use, is detachably connected to the hand tool as an auxiliary handle (2), includes at least one detection device (6), which communicates with at least one regulating and/or control element in the electric hand tool through a contactless signal transmission device.

10 Claims, 2 Drawing Sheets

HANDLE WITH DETECTING UNIT

CROSS-REFERENCE

The invention described and claimed hereinbelow is also described in DE 102 004 003 202.5, filed Jan. 22, 2004. This German Patent Application, whose subject matter is incorporated here by reference, provides the basis for a claim of priority of invention under 35 U.S.C. 119 (a)-(d).

The invention relates to a handle for an electric tool.

BACKGROUND OF THE INVENTION

Electric tools are provided with handles for operating them. Drills or pneumatic drills, for example, are provided with a handle that permits the electric tool to be held in the working position. This handle is frequently associated with an on-off switch and/or other controls. In the broadest sense, therefore, the handle is used to operate the electric tool. It permits the electric tool to be held in the working position, a force to be exerted, in particular along the central axis of the device and therefore parallel to the axis of a tool being used, for example a drill bit, and a torque to be exerted, which is used as a reaction torque opposing the torque resulting from the rotation of the tool when a load is placed on it.

In addition, auxiliary handles are known, which permit a two-handed operation of an electric tool. The main handle, which is usually situated at the end of the electric tool oriented away from the insert tool, is held with the one hand. This hand also operates the electric switch device, which is usually accommodated in this handle. In order to provide support, particularly in high-torque machines and in applications in which a powerful torque is exerted on the operator, for example when drilling with large diameters, when using annular drill bits, or when using the electric tool as a drive unit for a mixer, an auxiliary handle is provided, which permits the operator to also exert an assisting reaction torque with his other hand. Usually, this auxiliary handle is attached to the front end of the electric tool, i.e. the end associated with the tool-receiving socket. The handle is usually mounted either by means of an internal thread provided inside the machine, for example in the collar of the machine, or (more universally) through the use of a clamping strap or clamping device that is associated with the auxiliary handle and is slid over the collar of the machine and locked by means of a screw clamping mechanism.

A feature common to these handles known from the prior art is that they cannot be used for functions other than those mentioned above, namely holding the electric tool in a particular working position and exerting forces and/or a torque.

Specifically in high-torque electric tools or in electric tools that exert very powerful forces on the work piece, for example pneumatic drills, it is known that safe handling requires two-handed operation. The electric tools known from the prior art with the handles known from the prior art always supply the same output to the tool-receiving socket regardless of whether one or two handles are mounted and regardless of whether the operator is working with one or two hands. It is therefore possible, with the sudden occurrence of a spike in torque, for the electric tool to be thrown from the operator's hands. This is particularly the case if the insert tool, for example a large diameter drill bit or annular drill bit, jams in the work piece and the torque causes the machine to start rotating around the drill bit axis. If the user is not prepared for these abruptly occurring spikes in torque and is only holding the machine e.g. with the main handle at the rear end of the electric tool, then the rotation can easily throw the machine from the hand holding the electric tool, which can cause injuries to the operator. In particular, it is also possible here for the machine to slip out from the work piece and damage the work piece during the time that the insert tool and the driven tool-receiving socket are coasting to a final stop from the running state. It is also possible for it to damage nearby objects and injure the user himself.

Current designs for safely operating an electric tool known from the prior art by exerting the required reaction forces and the required reaction torque are only effective if the operator uses them conscientiously. Experience has shown that particularly with operators who regularly and routinely use electric tools, there is a significant degree of habitual negligence with regard to careful, safe practices with electric tools. For example, even high-powered and high-torque electric tools are often casually held with one hand or auxiliary handles are not even installed because an auxiliary handle has a natural tendency to lend the machine a slightly less agile feel.

SUMMARY OF THE INVENTION

The handle according to the invention includes at least one detecting unit. In comparison to the embodiment forms known from the prior art, it has the advantage that various physical values can be detected and used for operation control.

In the embodiment of the detecting unit in the form of an equipment detecting unit, it is possible to determine, for example, whether a handle, in particular an auxiliary handle, is attached to the electric tool. It is possible to detect other equipment features, as long as the detecting unit is suitably designed to do so. For example, a chuck setting can be detected, thus allowing inferences to be drawn regarding the presence of the tool and the torque to be expected from it.

When embodied in the form of an operation-detecting unit, the device senses whether and how the operator is grasping the electric tool.

The values detected generate electrical signals inside the detecting unit integrated into the handle. In this connection, either a binary state change of the signal occurs, depending on whether or not the detecting unit has detected the corresponding value, or a signal change (or a change in an applied voltage) occurs, which is essentially analogous or essentially proportional to the detected value. It is likewise possible for the detecting unit to generate a signal in a form appropriate to the intended use, which signal corresponds to an applied or detected value and is transmitted, for example via contacts or a bus system, to the electric tool and to a control and/or regulating unit integrated into the tool to which the handle is connected. The physical values detected can be signaled to the electric tool and evaluated there by means of the control and/or regulating unit or a switching device integrated into the electric tool. The control and/or regulating unit then automatically triggers a corresponding operating behavior of the electric tool. The same is true for the switching device; the control and/or regulating unit can change the operating behavior on an essentially continuous basis, while the switching device produces a binary state or changes it, e.g. switches the tool on or off.

The ability of the handle to function as a holding device for the electric tool is therefore independent of whether or not such a control and/or regulating unit is provided in the electric tool. The handle therefore offers an appropriately equipped electric tool additional functions that facilitate operation of the electric tool and/or make it safer. Independent of this, it can also be used simply as a holding device or as a combined holding and switching device in electric tools that are not so equipped, as is already known from the prior art. The term switching device here is essentially understood to mean the electrical on/off switch.

As described above, the handle can include a unit for detecting the machine equipment that is present or a unit for detecting one or more types of operation of the machine.

It is thus possible, as part of the operation detection, to determine whether the operator is holding the handle. To this end, the detecting unit can be embodied in the form of a contact sensor extending over a certain span of the handle surface, or in the form of a force sensor. It is then possible to detect whether the operator is holding the electric tool with only one hand or whether he is operating it with two hands. The term two-handed operation applies only when the operator is holding both the main handle and the installed auxiliary handle at the same time. The force sensor can also be embodied so that it detects any forces occurring in the region in which it is installed or permits conclusions to be drawn regarding the direction and magnitude of an applied force (vector), for example the holding force. In this case, the detection can occur the moment the electric tool is switched on in order to determine whether it is permissible to supply the maximum possible output when the operator is holding the electric tool with both hands or whether only a reduced output capacity is permitted due to a one-handed operation. The detection can also occur during operation of the electric tool, for example in order to be able to react to a release of the auxiliary handle by reducing the output. It is particularly advantageous to provide a combination of operation detection at the moment the electric tool is switched on and operation detection during operation.

By embodying the detecting unit as a torque sensor, it is also possible to detect a torque acting on the machine by detecting the reaction torque that the operator must exert and to evaluate this using a control and/or regulating unit of the drive that is integrated into the electric tool. Such a torque sensor can be positioned in an advantageous, structurally simple manner, for example on the screw clamping mechanism that encompasses the collar of the electric tool close to the power end, namely the drill chuck or the tool-receiving socket, for example. It can, for example, be embodied as an expansion band or can be comprised of several parts, for example with a corresponding mechanical locking mechanism on the electric tool and on the handle.

In the same way, the forces to be exerted by the operator, in particular holding forces, can be detected and supplied for evaluation to a control and/or regulating unit inside the electric tool. As a function of this detection, the control and/or regulating unit controls or regulates the torque and speed of the electric motor. To this end, a force sensor is provided, which detects the force transmitted between the operator and the handle.

The precise location of the corresponding detecting unit inside the handle is unimportant to the function of the invention, as long as the detection of the physical value to be recorded occurs with a sufficient degree of reliability.

The embodiment of a detecting unit in the form of an acceleration sensor even permits the evaluation of an acceleration of the electric tool out of its working position due to a sudden jamming of the machine and, after this is supplied to a control and/or regulating unit in the machine, permits an automatic shutoff of the drive unit of the electric tool or a triggering of an automatic braking mechanism of the tool-receiving socket, thus almost completely excluding a danger to the operator. The acceleration sensor is advantageously disposed inside a handle. Namely, if the handle experiences an acceleration (for example at one of its ends), then it thus possible to correctly conclude that an atypical and undesirable operating state is in the process of occurring, for example a jamming of the insert tool in the work piece. In other words, the acceleration of the electric tool detected in the handle occurs specifically due to the sudden occurrence of a force vector in a direction that is atypical during regular operation. Here, too, the precise location of the detecting unit in the handle is unimportant to the function of the invention, as long as the detection occurs with a sufficient degree of reliability.

The value detected by the detecting unit in and/or on the handle is transmitted to the electric tool via a contacting device. It is advantageous if such a transmitting device is embodied in the form of a contact device and a counterpart contacting device, in which the position and size of the contact areas correspond to each other.

In a particularly advantageous embodiment, the transmitting device operates in a contactless manner, namely through the use of an infrared interface between the handle and the electric hand tool or through the use of a suitable radio signal transmission device. In another advantageous embodiment, the transmission device is embodied to function inductively or capacitively.

The operation control of the electric tool therefore occurs in steps so that a detection is carried out as to whether the electric tool is being held by at least one handle, i.e. is being grasped firmly by it, and based on the results of this detection, the unit executes a corresponding regulation of the available output power and therefore the available torque at the power end.

In a modification of the invention, a detection is also carried out as to whether an auxiliary handle is attached to the electric tool.

In a modification of the invention, when the detection determines that the electric tool is equipped with a main handle and an auxiliary handle and both handles are being held, i.e. are being grasped firmly, then a higher torque is supplied at the power end than when either an auxiliary handle is not present or one of the handles is not being grasped firmly. This assures that the maximum power output of the electric tool is supplied only if the operator complies with safe operating practices and is holding the electric tool with both hands.

In a preferred modification of the invention, during the course of operation control, detecting units in the handle or in several handles continuously monitor the operating states of the electric tool for the occurrence of an abnormal operating force and/or an abnormal operating torque between the electric tool and the work piece and therefore between the electric tool and the operator and/or an abnormal operating acceleration. In this connection, a value is seen to be abnormal when it exceeds a particular preset value. Upon detection of at least one abnormal operating value, a control and/or regulating unit associated with the electric tool can reduce the power output more or less rapidly and more or less sharply, to zero if need be, possibly by switching off the drive motor, and/or an automatic braking mechanism can be triggered, which achieves a particularly rapid stopping of the insert tool and/or of the power end.

BRIEF DESCRIPTION OF THE DRAWINGS

The invention will be explained below in conjunction with several exemplary embodiments and the drawings.

DESCRIPTION OF PREFERRED EMBODIMENTS

Figure 1:
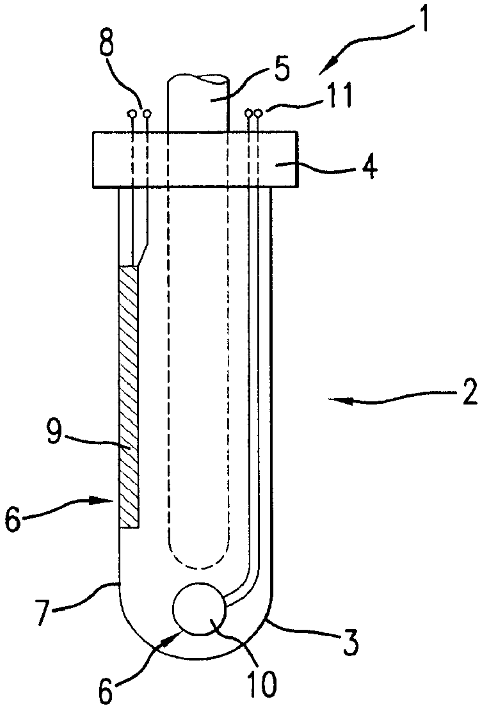
FIG. 1 shows a longitudinal section through an auxiliary handle for an electric tool.

FIG. 1 shows a handle 1 that is embodied as an auxiliary handle 2. The handle has a grip 3 that is provided with a hand guard 4. Essentially in the center inside the grip 3, there is a dimensionally stable, essentially rod-shaped support 5; its extension above the hand guard 4 is not shown, thus giving only a partial view of the support 5. This support 5 serves to attach the handle 1 to an electric tool, not shown, and in particular, to transmit force between the grip 3 and the electric tool, not shown. In its grip 3, the handle 1 has a detecting unit 6. This detecting unit is essentially provided over a certain portion of the surface 7 of the grip 3. The span over the surface 7 of the grip 3 must extend far enough to permit an unambiguous detection as to whether the handle is being grasped firmly or only touched loosely. The precise location of the detecting unit 6 on the surface 7 of the grip 3 is unimportant, as long as this function is reliably fulfilled.

In this exemplary embodiment, the detecting unit 6 is embodied as a capacitive detecting unit 9. The required electrical connections 8 to the electric tool, not shown, are routed through the grip 3 of the handle 1 and are connected to the electric tool by a suitable contacting device that is not shown in detail here. If an operator grasps the handle 1, this produces a change in the electrical capacitance in the detecting unit 6. This change can be repeated at the electrical connections 8.

As an additional detecting unit 6, an acceleration sensor 10 is provided, which is located inside the grip 3, at an end of the handle 1 oriented away from the machine. The precise location of the acceleration sensor 10 in the handle 1 is unimportant, as long as it reliably detects the occurrence of an acceleration. Preferably, the acceleration detector is placed at a location in the handle 1 that is powerfully affected by the occurrence of an acceleration, thus permitting the detector to easily and reliably detect such an acceleration. The acceleration sensor 10 also contacts the electric tool, not shown, via suitable electrical lines and contacts 11.

The fact that the electrical connections 8 and 11 are connected signals the electric tool, not shown, that the auxiliary handle 2 is attached, thus permitting the electrical values from the detecting units 6, namely the capacitance sensor 9 and the acceleration sensor 10, to be evaluated.

It is naturally possible to provide an auxiliary handle 2 with only one detecting unit or with more detecting units than are shown here; separate connections are provided for each detecting unit and for each detected value. The latter feature is not required if the selection of the data format (for example digital or multiplex) allows the transmission to occur over one channel or over fewer channels than there are values to be transmitted. Where and how the connections are produced is unimportant, as long as the above-described function is achieved. In particular, it is also possible for there to be a contactless transmission, for example by means of infrared, a suitable radio band, capacitive means, inductive means, or in the broadest sense, optical means.

In a particularly preferable embodiment form, the contact is produced by means of a standardized connection module that automatically produces the contact, as long as the auxiliary handle 2 and a handle 1 are attached to the electric tool, not shown. In this instance, the electric connection is inevitably produced as part of the mechanical coupling.

Figure 2:
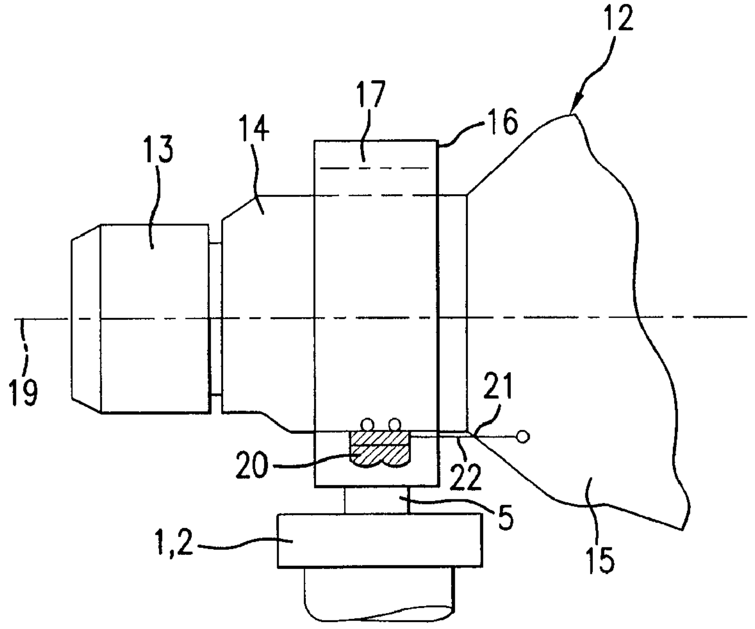
FIG. 2 shows a longitudinal section through a fastening device for an auxiliary handle for an electric tool.

FIG. 2 shows a schematic, sectional view of an electric tool 12, namely the end encompassing the tool-receiving socket 13, the tool-receiving socket 13 itself, the collar 14, and the housing 15 of the transmission and hammer mechanism. A fastening device 16 for a handle 1 embodied in the form of an auxiliary handle 2 is slid over the collar. The handle 1 is only depicted in a truncated view. The support 5 of the handle 1 is rigidly connected to an outer ring 17 of the fastening device 16. Inside the outer ring 17, an inner ring 18 is provided, which encompasses the collar 14 of the electric tool 12 in a frictionally engaging fashion. The inner ring 18 and the outer ring 17 can be rotated counter to the action of a return spring force between them, in the same direction as each other and in opposite directions from each other around the axis 19, which is simultaneously the rotation axis of the tool-receiving socket 13. The distance that this rotation can travel remains limited. The restoring spring force is supplied by a torque detecting unit 20, which is disposed in the fastening device 16 so that it is associated with both the inner ring 18 and the outer ring 17; the torque detecting unit 20 detects a rotation of the two rings 17, 18 around the axis 19 counter to a return spring force, which is supplied by the torque detecting unit 20, and also detects the expenditure of force that corresponds to the torque occurring between the two rings 17, 18 around the axis 19.

The transmission of the detected to torque (signaling) to the electric tool 12 occurs, for example, via a contacting device 21 that can be connected directly or by means of a cable connection 22 or, in a particularly preferable embodiment form, directly via contacting devices 23 contained in the collar 14 of the electric tool 12, disposed directly opposite the torque detecting unit 20.

A corresponding multi-poled embodiment of contacting devices 23 between the collar 12 and the fastening device 16 of the auxiliary handle 2 also makes it possible for additional physical values detected by other detecting units 6 inside the auxiliary handle 2 to also be transmitted to the electric tool 12 by means of electrical signaling. It is naturally also possible to transmit other values because the contacting devices 23 are embodied as multi-poled, not in accordance with the number of values or channels to be transmitted, but through selection of a suitable data format (possibly digital or multiplex).

It is naturally also possible to design the torque detector and the contacting device differently, as long as the above-described functions are reliably fulfilled. Where and how the contacts of the contacting devices 23 are produced is unimportant, as long as the functions described above are fulfilled. In particular, it is also possible for there to be a contactless transmission, for example by means of infrared, a suitable radio band, capacitive means, inductive means, or in the broadest sense, optical means.

Figure 3:
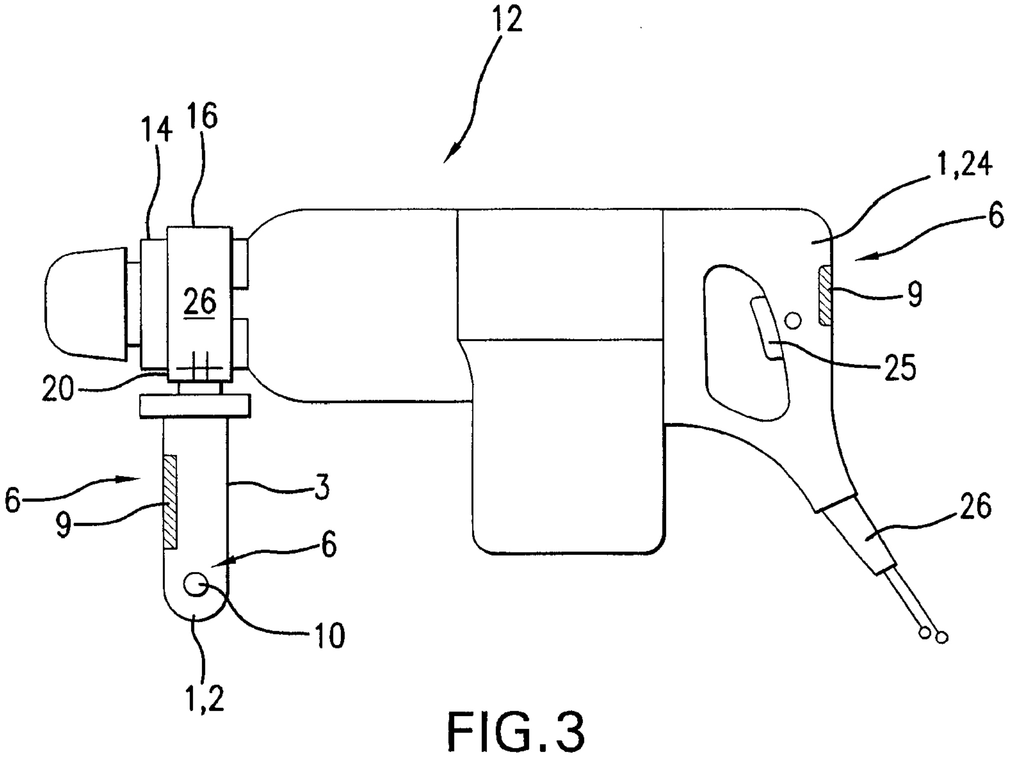
FIG. 3 shows an electric tool with an attached auxiliary handle and main handle.

FIG. 3 shows an electric tool 12 with two handles 1, namely an auxiliary handle 2 and a main handle 24. The main handle 24 is associated with an on/off switch device 25 and a power cable 26. The main handle 24 is provided with a detecting unit 6 that is embodied in the form of a capacitance sensor 9 and detects the grasping of the main handle 24 through a change in the electrical field. The electric tool 12 is also provided with a handle 1 embodied in the form of an auxiliary handle 2, whose grip 3 contains a detecting unit 6 embodied in the form of a capacitance sensor and a detecting unit 6 embodied in the form of acceleration sensor 10. A fastening device attaches the auxiliary handle 2 in a frictionally engaging manner to the collar 14 of the electric tool. A torque sensor 20 is provided inside the collar 14, between its inner and outer ring 17, 18, which are described in conjunction with FIG. 2 and not shown in detail here. The signals of all of the detecting units contained in the auxiliary handle 2 in FIG. 3 and the signals of the torque sensor are transmitted via the collar 14 to the electric tool 12 by means of a contacting device 26.

The invention claimed is:

1. A handle for an electric hand tool, wherein the handle, in use, is detachably connectable to the electric hand tool as an auxiliary handle and comprises at least one detection device that communicates with at least one element selected from the group consisting of a regulating element and a control element in the electric hand tool by a contactless signal transmission device.

2. The handle according to claim 1, wherein the at least one detection device (6) is a sensor selected from the group consisting of a contact sensor and a force sensor.

3. The handle according to claim 1, wherein the at least one detection device (6) is in acceleration sensor (10).

4. The handle according to claim 1, wherein the at least one detection device (6) is a torque sensor (20).

5. The handle according to claim 1, wherein the at least one detection device (6) is associated with an infrared signal transmitting device.

6. The handle according to claim 1, wherein the at least one detection device (6) is associated with a radio signal transmitting device.

7. The handle according to claim 1, wherein the at least one detection device (6) is associated with a contactless inductive signal transmitting device.

8. The handle according to claim 1, wherein the at least one detection device (6) is associated with a contactless capacitive signal transmitting device.

9. An electric tool with a handle according to claim 1.

10. An electric hand tool, comprising at least one element selected from the group consisting of a regulating control element and a control element and located inside the electric hand tool; and a handle detachably connectable to the electric hand fool as an auxiliary handle, said handle including at least one detection device that communicates with the at least one element inside the electric hand tool by a contactless signal transmission device.

* * * * *